United States Patent
Thomas et al.

(10) Patent No.: US 7,282,697 B2
(45) Date of Patent: Oct. 16, 2007

(54) HIGH SENSITIVITY FIBRE OPTIC VIBRATION SENSING DEVICE

(75) Inventors: Sean Dormer Thomas, Dorchester (GB); Mark Allen Lee, Dorchester (GB); Philip John Nash, Dorchester (GB); David John Hill, Dorchester (GB)

(73) Assignee: Qinetiq Limited (GB)

( * ) Notice: Subject to any disclaimer, the term of this patent is extended or adjusted under 35 U.S.C. 154(b) by 217 days.

(21) Appl. No.: 10/502,371

(22) PCT Filed: Jan. 15, 2003

(86) PCT No.: PCT/GB03/00192

§ 371 (c)(1),
(2), (4) Date: Jul. 23, 2004

(87) PCT Pub. No.: WO03/062772

PCT Pub. Date: Jul. 31, 2003

(65) Prior Publication Data

US 2005/0115320 A1    Jun. 2, 2005

(30) Foreign Application Priority Data

Jan. 25, 2002    (GB) ................................. 0201760.6

(51) Int. Cl.
*G01J 1/04* (2006.01)
*G01P 15/00* (2006.01)
(52) U.S. Cl. .............................. 250/227.14; 73/514.01
(58) Field of Classification Search ........... 250/231.14, 250/231.1, 227.14; 73/514.01, 514.02, 514.04
See application file for complete search history.

(56) References Cited

U.S. PATENT DOCUMENTS

| | | | |
|---|---|---|---|
| 4,536,861 A | 8/1985 | Graindorge et al. | |
| 4,959,539 A | 9/1990 | Hofler et al. | |
| 5,317,929 A | 6/1994 | Brown et al. | |
| 5,369,485 A | 11/1994 | Hofler et al. | |
| 5,903,349 A | 5/1999 | Vohra et al. | |
| 6,056,032 A | 5/2000 | Vohra et al. | |
| 6,191,414 B1* | 2/2001 | Ogle et al. | 250/227.14 |
| 6,305,639 B1* | 10/2001 | Bocciola | 242/613.4 |
| 6,328,837 B1 | 12/2001 | Vohra et al. | |
| 6,473,183 B1* | 10/2002 | Tweedy et al. | 356/477 |
| 6,496,264 B1* | 12/2002 | Goldner et al. | 356/478 |
| 2001/0055438 A1 | 12/2001 | Wu et al. | |
| 2004/0074299 A1* | 4/2004 | Rud et al. | 73/514.26 |

FOREIGN PATENT DOCUMENTS

| | | |
|---|---|---|
| EP | 1176406 | 1/2002 |
| WO | WO 01/40742 | 6/2001 |
| WO | WO 02/10774 | 2/2002 |

\* cited by examiner

*Primary Examiner*—Georgia Epps
*Assistant Examiner*—Kevin Wyatt
(74) *Attorney, Agent, or Firm*—McDonnell Boehenen Hulbert & Berghoff LLP (57) ABSTRACT

A vibration sensing device, an acceleration sensing system and a method of manufacturing a vibration sensing device wherein the vibration sensing device comprises a flexible disk that is mounted symmetrically about a radial plane and has a mass located on the disk substantially symmetrical about this radial plane which exerts a force that is greater towards the edge than it is towards the centre of the disk. The vibration sensing device is sensitive to on-axis signals and insensitive to cross axis signals.

34 Claims, 5 Drawing Sheets

HIGH SENSITIVITY FIBRE OPTIC VIBRATION SENSING DEVICE

The present invention relates to the field of vibration sensing and in particular, in certain preferred embodiments to acceleration sensing.

Current vibration sensing devices and, in particular, accelerometers are typically electrical devices utilising the reverse piezo-electric effect. The mass is typically connected to a case through the active material and the signal is proportional to the displacement of the mass relative to the case. High sensitivity accelerometers also require electronics at the accelerometer and with multiplexing this leads to a device which may be rather large and unwieldy. Furthermore, these electrical devices require good screening to prevent EM pickup, this can lead to large and unwieldy cables.

Vibration sensing devices are used in the field of seismic surveys as seismic sensing devices, such as geophones or accelerometers, to detect vibrations. Generally, a plurality of seismic sensing devices are used together in arrays. In the field of seismic surveying by far the bulkiest equipment are these Seismic sensing device arrays, which typically comprise 1,000 to 10,000 individual units. Each of these units typically consist of four elements, such as a hydrophone and three seismic sensing devices. A typical seismic sensing device used in these arrays is of a heavy piezo-electric type. The electrical seismic sensing devices all require a buffer amplifier and filter in the actual seismic sensing devices themselves, this makes the device heavy and large. There is also a demand for power in each of these seismic sensing devices. This power demand can build up to a significant level with the multiple units used. Furthermore, even with multiplexing, the cables required to carry the signals and the power are bulky and difficult to handle.

Alternatives to piezo-electric vibration sensing devices include fibre optic vibration sensing devices, these have the advantage of being light, being linked by optical fibre rather than copper cables and of using a fibre optic interferometric measurement technique which is a highly sensitive technique. The optical fibre seismic sensing device offers a package which can be easily multiplexed and is also completely passive in that is it does not require any electrical power at the sensing head, all electrical power being at the interrogation end. The common designs use a number of different transduction methods such as flexural disks or flexible mandrels. These vibration sensing devices do have some drawbacks, for example, to achieve the required sensitivity a large mass may be used, this leads to a small frequency range and a bulky device. Some examples of fibre optic accelerometers are given below.

U.S. Pat. No. 5,317,929 discloses a fibre optic accelerometer. This accelerometer comprises a pair of flexible disks mounted circumferentially on a rigid cylindrical body and having a mass mounted on a rod which extends between the disks and is centrally attached to both. An optical fibre is mounted in a spiral on the lower side of the upper disk and the upper side of the lower disk. The optical fibres are accessible at one end, having reflective portions at the other. Any variation in the length of the spiral optical fibres caused by flexure of the disks is detected and provides an indication of acceleration caused by physical displacement, shock or vibrations.

U.S. Pat. No. 5,369,485 discloses a similar fibre optic accelerometer, but in this case there are a plurality of disks mounted centrally by a cylinder which is attached at one end to a rigid body. The disks have a single cylindrical mass which is attached to the periphery of each of the disks and optical fibre spirals mounted on both sides.

U.S. Pat. No. 5,903,349 discloses a fibre optic accelerometer comprising a disk having an optical fibre coil on its upper and lower surfaces, the disk being mounted centrally within a housing. There are no masses mounted on the disk.

Vibrations sensing devices such as accelerometers and in particular, those used in seismic sensing typically wish to measure signals such as acceleration in one direction and to be resistant to signals from other directions. The devices of the prior art suffer from problems of cross-axis sensitivity with off axis acceleration signals affecting the detected results of these accelerometers. Furthermore, many of the seismic sensing devices of the prior art are insensitive and thus, do not detect small vibrations. In an attempt to increase sensitivity some of the devices incorporate large masses, these tend to make the device heavy and unwieldy.

According to a first aspect of the invention there is provided a vibration sensing device comprising a flexible disk having a first surface and a second surface, said first and second surfaces lying on either side of a radial plane; a mounting means arranged to mount the disk centrally and substantially symmetrically about said radial plane, such that a central portion of said first and said second surfaces of said disk are constrained from moving while the circumferential edge of said disk is free to move; a mass located on said disk such that it lies substantially symmetrically about said radial plane and exerts a force on said disk which is greater towards said circumferential edge of said disk than it is towards said central portion; an optical fibre mounted on said first surface of said disk, such that flexion of said disk produces a strain in said optical fibre which imposes a variation in at least one predetermined property of an optical signal transmitted through said optical fibre, said optical fibre being mounted such that at least one end is accessible for optical coupling to an optical device comprising a detector for detecting said changes in said at least one predetermined property of said transmitted optical signal.

The advantages of having an optical vibration sensing device rather than a piezoelectric device is that the signals are transmitted as optical radiation and as such the device is resistant to RF noise. Furthermore, the device requires no electrical power to the sensor and it is also significantly cheaper to produce than existing electrical devices. This particular design of optical vibration sensing device has further advantages of low cross axis sensitivity, due to the symmetrical mounting of both the mass and the disk about the disk's radial plane. In addition, the fact that a mass is mounted on the flexible disk increases the force exerted on the disk by any acceleration; mounting it such that its loading is greater at the circumferential edge further increases the flexion of the disk and thereby leads to a more sensitive instrument. These factors act in conjunction with the disk being mounted centrally which allows the outer edges to flex. The central mounting also allows the majority of the fibre to be concentrated in this outer area of increased deflection. A problem with devices of the prior art is that a high mass can increase sensitivity but may reduce the bandwidth. The above mentioned arrangement of mass and optical fibre produce a device that has high sensitivity and a high bandwidth. In particular, the mechanical arrangement of the vibration sensing device is such that a resonant frequency of the order of 1 kHz is typical. This means that the frequency range of interest is well below the resonant frequency. When you operate well below the resonant frequency you are in a flat frequency response region so that the device shows a linear response to different drive levels from the low frequency limit of the test equipment to the desired high frequency limit.

All of the above help to produce a seismic sensing device which is resistant to off-axis and other undesired signals, whilst still being highly sensitive to the on-axis signal. Thus, a device that exhibits a high rejection of extraneous influences whilst still being relatively low mass can be produced.

Preferably, said vibration sensing device further comprises a counterweight mounted on said second surface of said disk in order to counterbalance said optical fibre.

In the devices of the prior art, there are generally two optical fibre sensing coils used, one mounted on either side of the disk. The use of a single coil reduces the cost of the device, and by counterbalancing the optical fibre mounted on the first surface of the disk the neutral plain of bending is moved back to the central plain of the flexible disk, this helps reduce cross-axis sensitivity.

Advantageously, said counterweight comprises a further optical fibre mounted symmetrically about said transverse plane to said optical fibre.

The simplest way to counterbalance the optical fibre is to mount an identical optical fibre symmetrically with the first one. The flexural disk then has two wound coils mounted on it, with generally only one being used to sense the vibration, the other being used to balance the mechanical effect of the sensing coil. There is an option included in this design such that both of the coils may be used in the sensing this, however, results in a more expensive sensor.

Preferably, both ends of the optical fibre are accessible for optical coupling to further optical devices.

Generally, in devices of the prior art only one end of the optical fibre is accessible for coupling to external devices, the other end being located well within the device and having a reflective portion. Thus, any signal travelling through the fibre from the accessible end, is reflected back through the fibre by the reflective portion, exiting the fibre at the end that it entered. In the device according to an embodiment of our invention, the optical fibre is mounted on the flexible disk such that both ends of the optical fibre are accessible for external connection. Thus, a signal entering the device via one end of the fibre can exit it via the other end; this makes the device particularly adaptable for configuration into an array architecture. The nature of the device also facilitates the use of array architecture with a high degree of multiplexing using both Dense Wavelength Division Multiplexing (DWDM) and Time Division Multiplexing (TDM) being possible.

Although the optical fibre can be mounted in a variety of ways on the disk it is preferably mounted in a spiral.

Preferably, said first surface of said disk comprises two grooves said two grooves being arranged symmetrically to each other about a first diameter of said disk, each of said two grooves running from a radially inner end to a radially outer end of said disk, a portion of said optical fibre adjacent said at least one accessible end running along at least one of said grooves, said at least one accessible end of said optical fibre being arranged outside of said disk.

Having grooves in the surface of the disk to hold at least a part of the optical fibre mean that less care is need in the handling of the built disk; they also provide an exit route for the ends of the optical fibres from the disk avoiding the mass.

Advantageously, two portions of said optical fibre adjacent said two accessible ends run along respective ones of said two grooves, said two accessible ends of said optical fibre being arranged outside of said disk.

In preferred embodiments said outer ends of said grooves lie at a circumferential edge of said disk. This enables the ends of the fibres exiting the disk via these grooves to be easily accessible for external connection.

Preferably, the second surface of said disk further comprises grooves, said grooves being arranged symmetrically about said radial plane to said grooves on said first surface. This arrangement produces a disk that is symmetrical about its radial plane.

Preferably, said mass is attached to said disk close to said circumferential edge of said disk. More preferably, said mass is only attached to said disk at mounting points adjacent to said circumferential edge.

By mounting the mass in this manner, any stiffness of the mass only has a small effect on the flexion of the disk and its modes of vibration.

A preferred form of the mass comprises a pair of annular masses connected together at their outer edges by a cylinder, said cylinder comprising a lip for attachment to said circumferential edge or said mounting points adjacent to said circumferential edge of said disk. This mass only holds the outer circumferential edge and thus allows the disk to flex in its normal way. In some embodiments said mass comprises a first and a second mass, said first and second mass being mounted symmetrically about said disk to each other.

It is important that the loading of the disk is symmetrical such that the plane of bending passes through the centre of the disk. Furthermore, having two masses mounted like this enables an arrangement whereby the masses do not extend beyond the circumferential edge of the disk.

Preferably, said mass does not extend beyond said circumferential edge of said disk. This arrangement provides a compact device.

Preferably, said first and second mass only contact said disk at an area adjacent to a circumferential edge of said disk. This allows the disk to flex with little impedance.

In preferred embodiments said mass has an annular shape. This is a convenient shape for a mass that is to be mounted on a flexural disk. By annular shape a shape having a substantially circular cross section with a hole through the middle is envisaged.

Advantageously, said mass has a circumferential lip, said circumferential lip contacting said disk. A convenient shape for a mass that is mounted on a disk and only contacts the disk close to the edge is an annularly shaped mass with a circumferential lip.

In preferred embodiments said annular mass is mounted to said disk via mass mounting means, said mass mounting means being located at a radially inner portion of said mass and said disk.

By providing mounting means towards the radially inner portion of the disk, it is the radially inner portion that is affected by the mounting means and thus cannot be used for mounting the optical fibre. The outer portion of the disk flexes more and thus the flexion can be more sensitively measured if the sensing optical fibre is mounted towards the outer portion of the disk.

Preferably, said mounting means pass through holes in said first mass, said disk and said second mass and hold said masses to said disk such that an outer edge of said disk is clamped between said outer circumferential lips of said first and second masses, said mass mounting means being arranged such that they do not contact said disk.

Although the mounting means are towards the inner portion it is the outer portion that contacts the disk, the outer circumferential edge being clamped between the two masses and thus the masses act on the outer portion, this means that the mass has a large effect. Furthermore, the fact that the mounting means do not actually contact the disk means that the disk's flexion is relatively unaffected by their presence.

Although the optical fibre can be mounted at any position on the disk it is preferably mounted towards the circumferential edge of said disk.

The coil is preferably mounted to maximise the amount of fibre at the periphery of the disk, which is the region of maximum deflection. Furthermore, mounting the fibre on the outer portion has the further advantage of providing a coil with a large bend radius thereby reducing optical losses. Additionally, the optical fibre will not have to be mounted in as many layers to produce the same length on the outer portion of the disk as it would on an inner portion. Reducing the height of the coil can increase the sensitivity of the device. In preferred embodiments, a further optical fibre is arranged outside of said optical fibre, wherein said circumferential lip of said mass contacts said further optical fibre.

Arranging a further optical fibre in this position for the lip to contact means that the lip does not contact and possibly damage the sensing fibre. However, the lip does contact a fibre and as such its length is less than it would be if the lip had to directly contact the disk. This makes it more robust. The use of optical fibre is simple and cheap and provides a certain uniformity of material across the disk.

Advantageously, said vibration sensing device comprises protective sheathing covering said optical fibres.

Sheathing can be applied to the fibres to protect them and make the device more robust. Although the sheathing can be used to cover the entire fibre, it is particularly advantageous to cover the fibre in the groove thereby protecting the fibre at its most vulnerable point and in some embodiments only this portion of the fibre may be covered.

Although the disk can be formed of any flexural material the disk preferably comprises an aluminium disk.

The use of an aluminium disk means that the disk dominates the flexural behaviour of the system, before the mass is added, and not the sensing coil, thereby reducing the importance of the non-linear behaviour of the resin system.

Although the disk can be a variety of thicknesses, preferably it is between 3 mm and 0.5 mm thick, and more preferably 1 mm thick.

A thin disk means that the optical fibre sensor is close to the plane of bending of the disk.

Although it is not necessary, preferably the vibration sensing device further comprises a housing, said mounting means mounting said first and said second surfaces of said flexible disk to opposing internal surfaces of said housing. This provides protection to the device and makes it easier to handle.

In preferred embodiments said housing comprises frustoconically shaped end pieces, said disk being mounted to a narrow end piece of said frustoconically shaped end pieces. This arrangement is robust and helps protect the disk from off-axis signals and signals which may be picked up by the housing.

In embodiments where the mass mounting means are towards the inner portion of the disk said frustoconically shaped end pieces comprise a cylindrically shaped extension on said narrow end, said disk being mounted to said cylindrically shaped extensions. This arrangement provides space for mounting means arranged at a radially inner portion of the mass and disk.

Preferably, said mass is shaped such that it fills a substantial portion of the space between said disk and said frustoconically shaped end piece. The use of most of the space in this way means that a relatively large mass can be used without increasing the size of the device.

A further aspect of the present invention provides a vibration sensing system, comprising: a first plurality of vibration sensing devices according to a first aspect of the present invention; an electromagnetic radiation source and an electromagnetic radiation detector; said optical fibres of said first plurality of vibration sensing devices being arranged in optical communication with each other and with said electromagnetic radiation source and detector; said electromagnetic radiation source being operable to transmit an optical signal into said optical fibres of said plurality of vibration sensing devices; and said electromagnetic radiation detector being arranged to receive electromagnetic radiation output from said plurality of vibration sensing devices and to detect a variation in at least one predetermined property of said output optical signal.

The vibration sensing devices of the present invention are particularly well adapted to mounting in an array in a vibration sensing system. This makes them particularly adapted for use as seismic sensing devices.

A still further aspect of the present invention provides a method of manufacturing a vibration sensing device comprising the steps of: (i) passing an optical fibre through a reservoir of resin, such that a layer of resin coats said optical fibre, said optical fibre exiting said reservoir of resin via a needle, said needle being operable to position said optical fibre above said disk and being arranged to allow a suitable amount of resin to coat said fibre; (ii) winding said resin coated optical fibre onto a flexural disk such that a spiral of optical fibre is attached to said disk by said resin and at least one end of said optical fibre is accessible for connection to external optical components; wherein said optical fibre passes out of said reservoir of resin via a needle.

The manufacture of these disk vibration sensing devices comprises the coils being wound directly onto the flexural disk as opposed to bonding separate coils on this flexural disk. In this way significant time is saved in the manufacture of this design of vibration sensing devices as the coils are wound directly onto the disk and therefore there is no need to accurately align the coil on the base plate. A further advantage of mounting the coil directly onto the disk is that there is no intermediate substance (apart from a thin layer of the resin or adhesive binding the coil to the disk) to affect the flexion of the disk. Furthermore, the needle provides an excellent means for positioning the fibre accurately for mounting on the disk and for supplying the correct amount of resin.

Embodiments of the present invention provide a device using fibre optical coils wound circumferentially on to a flat flexural disk, during manufacture, with a mass symmetrically disposed on to the disk. The mass is split into two parts, which are mounted diametrically opposed on the flexural disk. The masses are so machined such that the loading is constrained to the outer edge of the flexural disk and it is further machined so that the fixings are also symmetrical. The sensing fibre coil is wound on to one side of the disk and is matched by a ballast coil on the other side to maintain the central position of the neutral plain of bending. This ballast coil may be replaced with a pseudo isotropic material, this material has the same effect on the position of the neutral plain of bending as the coil. The symmetrical mounting of the masses reduces the cross-axis sensitivity of the device. The fibre coil is accessible at either end of the fibre, this allows for the use of TDM and efficient multiplexing architectures. In embodiments of this invention the flexural disk undergoes strains induced by the inertia of the seismic masses attached to the disk and the displacement of the mounting structure. These strains are transferred in to the composite fibre coils diametrically wound on the flexural disk; the strains induced in the fibre change the optical path length by both changing the refractive index of the glass and the length of the fibre. The induced changes in the optical path length are then decoded by the interferometric interrogation system. The flexural disk is machined such that there is a central stub, which is coaxial with the flexural disk, one on each side to provide a foundation for the fibre coil. The disk is further machined so that there are slots in the surface of the disk to allow easy egress for the fibre.

It will be appreciated that the optical signal transmitted through the fibre optic sensor can take a variety of forms, and may for example be in the visible, ultraviolet, or infrared range. In preferred embodiments, the optical signal is an infrared signal. Further, it will be appreciated by those skilled in the art that the predetermined property of the optical signal which is varied in dependence on the received stimulus signal may also take a variety of forms, dependent on the construction of the fibre optic sensor, and for example may be phase, amplitude, polarisation, etc. In preferred embodiments, the predetermined property is phase.

Embodiments of the present invention will now be described, by way of example only, with reference to the accompanying drawings, in which.

Figure 1:
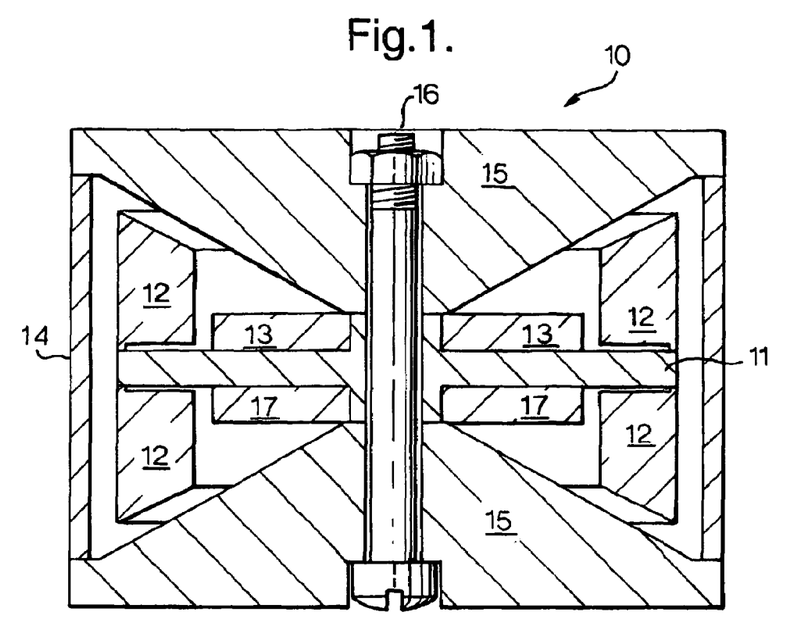
FIG. 1 shows a cross sectional view of a vibration sensing device or seismic sensing device according to an embodiment of the present invention.

FIG. 1 shows a fibre optic vibration sensing device or seismic sensing device (10) according to an embodiment of the invention, having a flexural disk (11), that carries a fibre coil (13) and annular Masses (12). The disk (11) is supported on cones (15) and clamped together using a machine screw (16), the entire construction is housed within a can (14) and cones (15). This design gives a high sensitivity to on-axis accelerations, while the symmetrical coils (13,17) and masses (12) mean that the cross-axis sensitivity is reduced. The induced strain in the coil (13) is detected using a high responsivity fibre optic interferometer of the existing types. Coil (17) is used to physically balance the sensing coil (13); this maintains the neutral plane of bending in the centre plane of the flexural disk (11). Coil (17) may be replaced by a different material that acts as a counterweight to sensing coil (13).

The dimensions of the device may vary depending on what is being measured, however, typically the disk (11) is about 2 mm thick with a disk radius of 15 mm. FIG. 1 is drawn to scale, so that the other dimensions of the device can be seen relative to the disk from this Figure. The fibre length in the coil (13) is typically about 20 m, and its thickness is 2 mm. The mass may vary in weight but is typically about half a kilogram.

Figure 2:
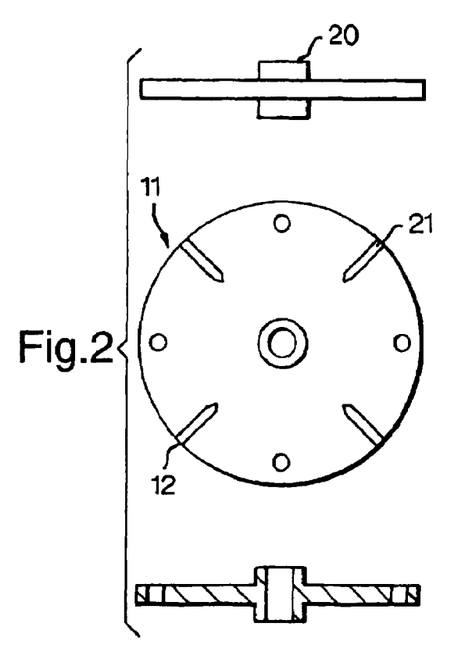
FIG. 2 shows the flexural disk portion of the seismic sensing device of FIG. 1.

FIG. 2 shows the flexural disk (11) in greater detail. The flexural disk (11) is machined from a solid bar of material, with a suitable modulus of elasticity and density such as aluminium. This disk (11) exhibits a coaxial stub (20) on each face of the disk (11). Also on each face there are four grooves (21) cut into the surface of the disk (11), these extend from the edge of the disk to the outer edge of the fibre coils (13,17). All the features of disk (11) are symmetrical around the plain of the disk and also exhibit rotational symmetry around the axis of the disk (11).

The grooves (21) allow the input and output fibre to pass underneath the mass (12) between and the disk and the mass and exit the seismic sensing device case (14). The disk (11) has a surface finished using suitable device such as a grit blaster to remove any large scale surface anomalies and to provide a good mechanical key to bond to. After the surface is finished it is then primed with a suitable primer, such as 3M's EC1945 two part chromate primer.

Figure 3:
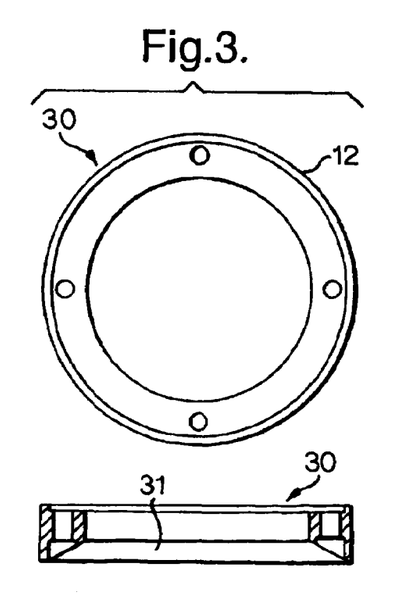
FIG. 3 shows the annular mass of the seismic sensing device of FIG. 1.

The annular masses (12) are shown in FIG. 3 and are to increase the inertia of the disk of the seismic sensing device and to thereby increase the sensitivity of the device. The masses (12) are formed from a suitable material with sufficient density to dominate the flexural loading of the disk (11). The masses (12) are machined so that they have a small lip (30) this lip (30) contacts the disk (11) along the circumference so as to provide a very low effect on the mode of vibration. Conical taper (31) is cut into the disk; this taper is to match the taper of the conical supports (15).

Figure 4:
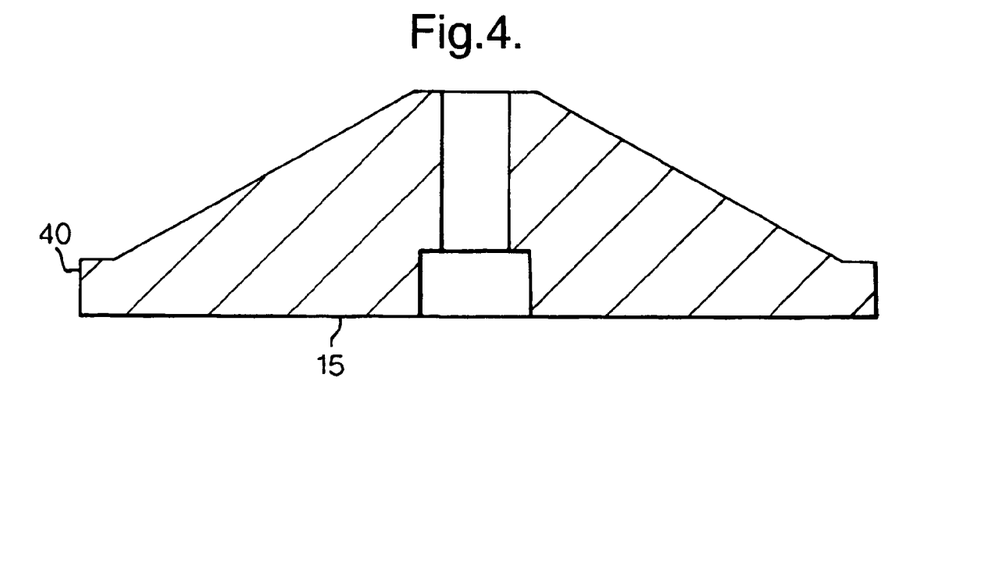
FIG. 4 shows the mounting cone, for mounting the disk to the housing in the seismic sensing device of FIG. 1.

FIG. 4 shows the conical mounting (15) for the disk (11), it is designed in this manner so that increased stiffness is achievable for low mass. The step (40) is to take the enclosure can (14).

Figure 5:
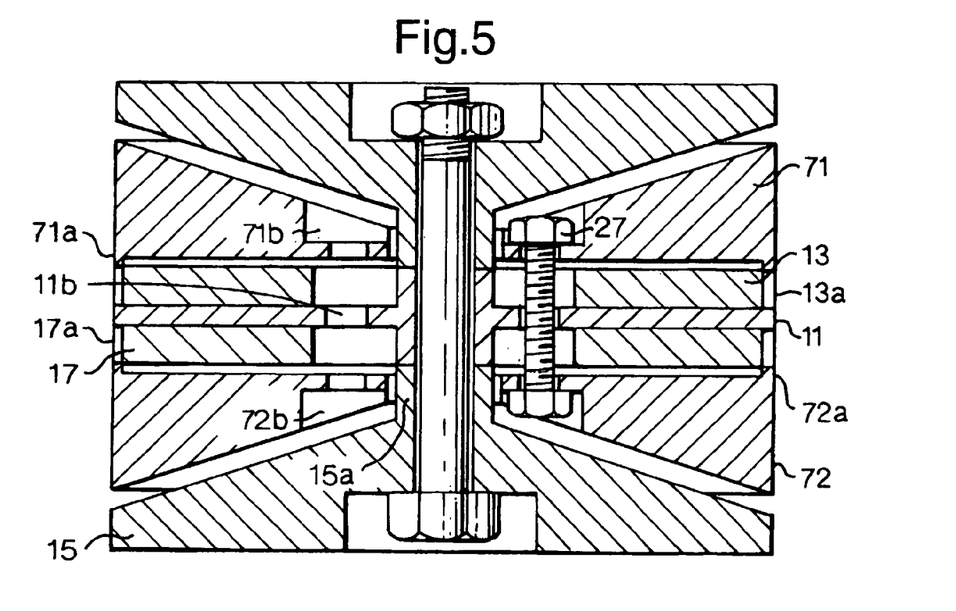
FIG. 5 shows a cross sectional view of a vibration sensing device or seismic sensing device according to an alternative embodiment of the present invention.
Figure 6:
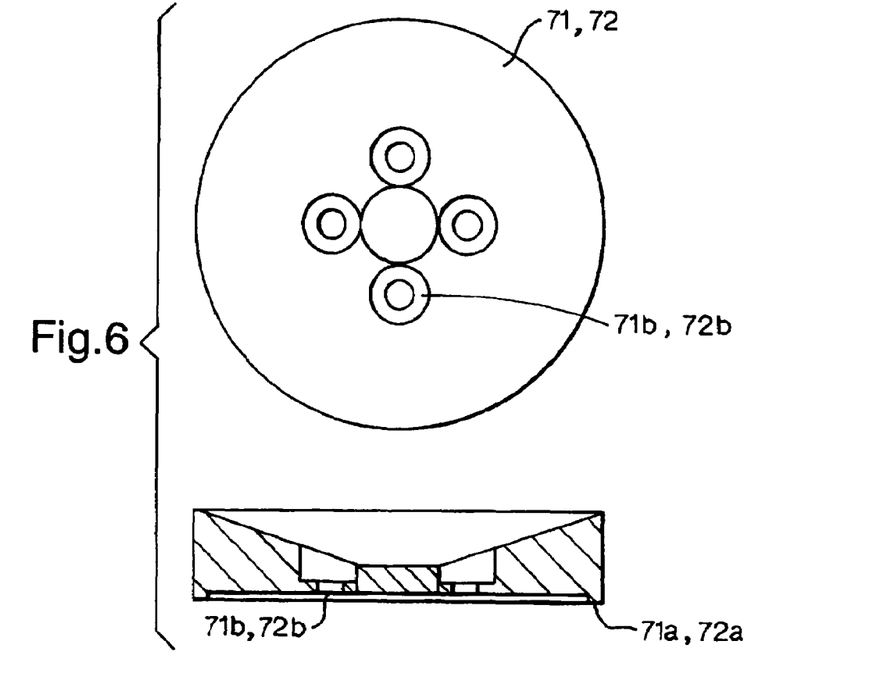
FIG. 6 shows one of the annular masses of the seismic sensing device of FIG. 5.
Figure 7:
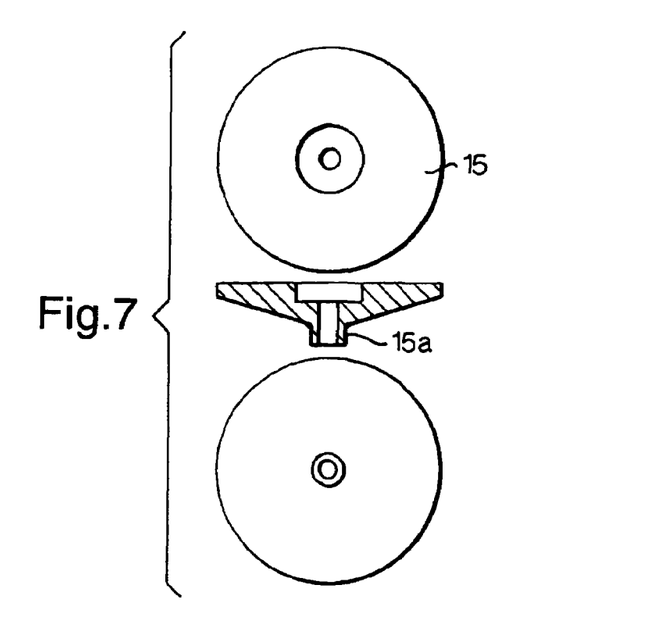
FIG. 7 shows the mounting cones of the seismic sensing device of FIG. 5.

FIGS. 5 to 7 show an alternative embodiment of the vibration sensing device. This embodiment shows two masses 71, 72 which are mounted symmetrically on either side of a disk 11. The masses have a substantially annular shape and have a diameter that is substantially similar to the diameter of the disk. The masses also each have an outer protruding lip 71a, 72a between which the outer circumferential edge of the disk is clamped when the masses are mounted to the disk.

To allow the disk 11 to deform under loading a mounting cone 15 (shown in detail in FIG. 7) is required as in the previous embodiment; the cone is used to impede any unwanted resonances in the casing interfering with the motion of the disk 11. In this embodiment the cones have a small stub axle 15a which passes though a central hole in the annular masses 71, 72. This provides clearance between the mounting means and inner portion of the disk and thereby allows space for the mass mounting means or bolt 27. In this embodiment the mass mounting means are found towards the centre of the disk. The mass mounting means or bolt 27 passes through holes 71b, 72b in both masses and a hole 11b in the disk. The holes in the disk are sized such that the bolts do not touch the disk and as such do not interfere with the flexion of the disk. In this embodiment there are four bolts (see FIG. 6) although any number could be envisaged. The holes are located in a radially inner region, this leaves the radially outer region of the disk free for the mounting of the optical fibre sensing coil. Furthermore, as the mass actually contacts the disk at the edge despite being mounted at the centre you have the advantage of the mass having a large effect while leaving much of the outer circumferential region of the disk free for mounting an optical fibre sensing coil 13.

Furthermore, as the optical fibre is mounted on the outer portion of the disk the bend radius is relatively large and this reduces optical losses. Generally the minimum bend radius in this embodiment is greater than 6.5 mm (as opposed to 2.5 mm in the embodiment of FIG. 1). Furthermore, mounting the optical fibre in the outer region means that you do not need as many layers of optical fibre for the same length as you would do if it were mounted in an inner region. Fewer layers reduces the height of the optical fibre coil and means that the central plane of the optical fibre sensing coil is closer to the plane of bending of the disk. A thin disk also helps brings these planes close to each other. The amount of motion experienced by the optical fibre increases proportionally to the square of the distance between the plane of bending of the disk (which generally passes though its centre) and the central plane of the sensing coil. However, the stiffness of the disk increases proportionally to the cube of this distance, thus responsivity of the device decreases as this distance increases. For these reasons the optical fibre is mounted directly to the disk with no intermediate material except for a thin layer of adhesive, and a thin disk and a thin coil are preferred.

The optical fibre sensing coil 13 stops at a certain distance from the outer edge of the disk and a fly lead is left for connection to other optical components. A further inert coil 13a is then mounted on the outer region of the disk. Similarly, on the opposite side of the disk an inert coil 17a is mounted outside the counterbalance coil 17. These coils are arranged such that the circumferential lip of the masses contact the disk at the point these coils are mounted. As these coils are not interrogated any damage to the fibre is unimportant. The inert coils 13a, 17a mean that the lip 71a, 72a of the mass need not be so long which makes it more robust. Furthermore, they provide a uniformity of the material across the disk.

The shape of the masses (see FIG. 6) is such that the outer portion has a cross section with a similar slope to the cone on which the mass is mounted. This means that a relatively large mass can be mounted within the device without increasing the size of the device. The mode of operation of the devices of the two embodiments is as follows. The device 10 is mounted with one of the cones 15 in intimate contact with the structure or body under investigation. If the structure moves then this will impart a motion to the cone 15, if the motion of the structure is in the direction of the axis of the cone a force is applied to the disk along its axis. When a force is applied to the disk 11 the inertia of the masses acting on the edge of the disk causes the disk to deform. The maximum displacement of the disk is towards the edge so the fibre in the coils is localised in the areas of maximum displacement.

When the disk is flexed the deformation is transferred to the fibre coil. This deformation causes the fibre to be stressed along its length. Thus stress will result in a length change that can be detected using fibre optic interferometry techniques.

Figure 8:
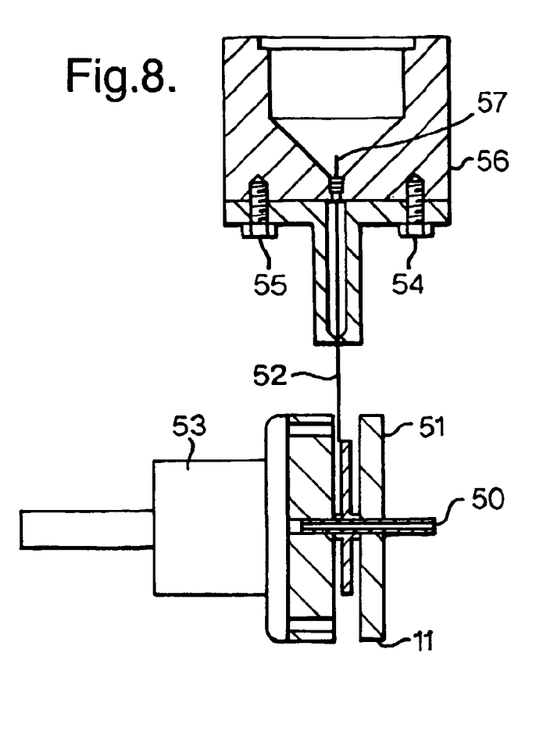
FIG. 8 shows a means of winding a fibre optic onto the disk according to an embodiment of the present invention.

FIG. 8 shows the wet winding apparatus used to form the coils (13,17) the fibre (57) passes through a bath (56) of fluid epoxy resin and hardener mixture or other similar bonding material. Epoxy resin is particularly appropriate due to its high rigidity. The fibre (57) then passes through a hypodermic needle (55); this needle is used to position the fibre in the correct position on the disk (11) and to strip the excess resin from the fibre (57). The fibre (57) passes around the stub (20) on the disk (11) and passes on to the winding mandrel (53). Item (54) holds the needle rigidly in position relative to the bath (56) and the positioning arm of the precision winding machine.

The disk (11) is held on to the mandrel (53) by use of threaded bar (50) and an appropriately sized washer and nut. Plates (51) and (52) are polished and coated with a mould release film. This arrangement holds the disk firmly and allows the fibre coils (13,17) to be wound in situ on the flexural disk.

To fabricate the seismic sensing device (10) first the coils (13,17) have to be wound on to the disk (11) using the wet winding set up as in figure five. The faces of the winding plates (51) and (52) are polished and then covered in a release film as used by the composite manufacturing industry. The fibre (57) is passed through the bath (56) and needle (55) and fixed on to the disk (11), the start of the coil is chosen such that the fibre (57) starts at a groove (21). A wind of fibre (57) is taken around the stub (20) and then fixed to the mandrel (53). The bath is then filled with the appropriate resin system and the coil winding machine is started, when the requisite number of turns has been reached then the machine stops. A length of fibre (57) is drawn through and fixed to the mandrel (53), these lengths of fibre form the connecting leads. At this point the fibre (57) is broken and the ballast coil (17) is wound using a similar method.

The winding machine has an integral tension controller to prevent too much tension being applied to the fibre (57), which can reduce the device lifetime. The rotational velocity of the mandrel (35) is set at 500 rpm, this allows the tension controller to maintain the correct tension on the fibre and the positioning arm sufficient time to move the fibre to the correct place. Using the needle (55) position system it is not necessary to remove any excess resin as only the correct amount of resin is left on the fibre (57).

Once the epoxy resin has cured then the device (10) can be assembled from the chosen parts. Care must be taken to not damage the fibre (57) as it exits the disk (11) and the seismic sensing device can (14).

The Optical Fibre (57) used in an embodiment of this invention has a 6 micron core with an 80 micron cladding. However, other types of optical fibre could be used. The epoxy resin used must have a high modulus to transfer the strains from the disk (11) to the fibre (57).

Figure 9:
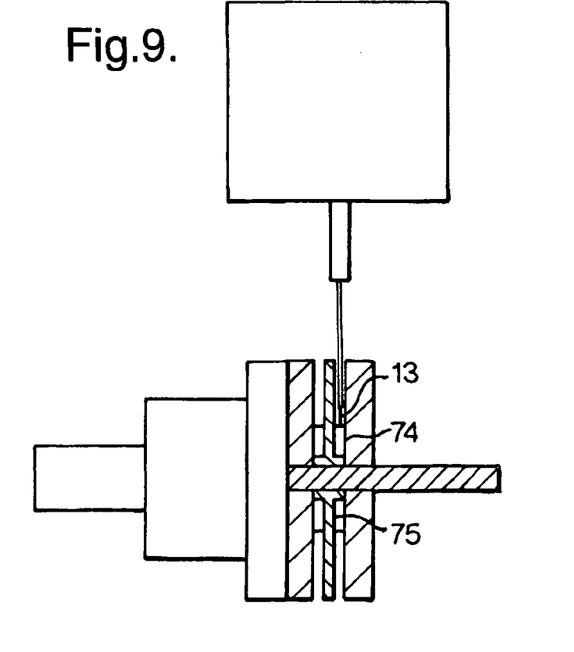
FIG. 9 shows a means of winding a fibre optic onto the disk to produce a seismic sensing device according to FIG. 5.

FIG. 9 shows a wet winding apparatus similar to that of FIG. 8 but with a couple of modifications to make it suitable for manufacturing the embodiment of the device illustrated in FIGS. 5 to 7. In particular it comprises spacers 74, 75. The fibre coil 13 is wound on to the disk outside of the spacer disk to a diameter of 0.5 mm from the edge of the disk. Both the input and output ends of the fibre are made safe to the winding jig and then a further inert coil 13a (not shown) is wound onto the sensing coil. As the fibres from the inert coil do not need to be interrogated fly leads from these are not needed. The process is then repeated on the other side of the disk so that coils 17 and 17a (not shown) are formed. The spacers are removed from the disk prior to assembly of the device.

Two masses 71, 72 (see FIGS. 5 and 6) are then bolted on to the disk such that the lips 71a, 72a clamps on to the inert coils 13a and 17a, thus the sensing coils are protected from damage by the mass. The holes 71b, 72b in the masses are shaped to take the head of a bolt and securing nut 27 (see FIG. 5). To allow the disk to deform under loading a mounting cone 15 is required. The cone is used to prevent any unwanted resonances in the casing interfering with the motion of the disk.

In operation when the seismic sensing device is accelerated along the axis of the retaining screw (16) the disk (11) is deflected, this deflection is a function of the physical dimensions of the disk (11), the stiffness of the disk (11) and the masses (12). The strains on the upper and lower surfaces of the disk (11) are equal and opposite, due to the positioning of the balancing coil (17) on the opposite side to the sensing coil (13). The strains are transferred to the coils (13,17). This strain causes a change in the optical path length of the coil in the seismic sensing device, which is then detected in the interferometer.

To prevent rocking modes being set up equal masses (12) are symmetrically applied to the upper and lower surfaces of the disk (11). The can, (14,15) is designed to prevent bending of the central screw (16), the end plates mounting cones (15) serve the dual purposes of creating an end to the package and holding the disk (11) securely. The mountings need to be stiff and as close to the centre of the disk (11) as possible, the cones (15) attach to the disk (11) at the stubs (20) and give the space for the masses (12) to be applied to the disk.

The optical vibration sensing devices of embodiments of the present invention are particularly well suited to assembly into an array, individual signals being isolated with the use of time division or wavelength division multiplexing. In particular, the accessibility of both ends of the optical fibre in individual vibration sensing devices aids in this array architecture.

Figure 10:
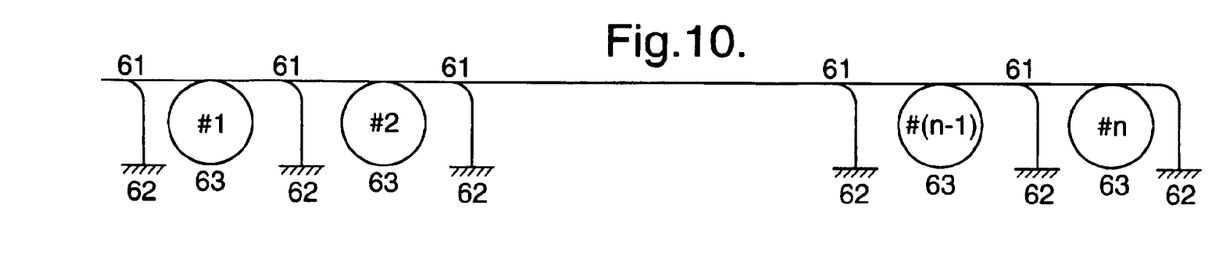
FIG. 10 schematically shows a plurality of vibration sensing devices arranged in series.
Figure 11:
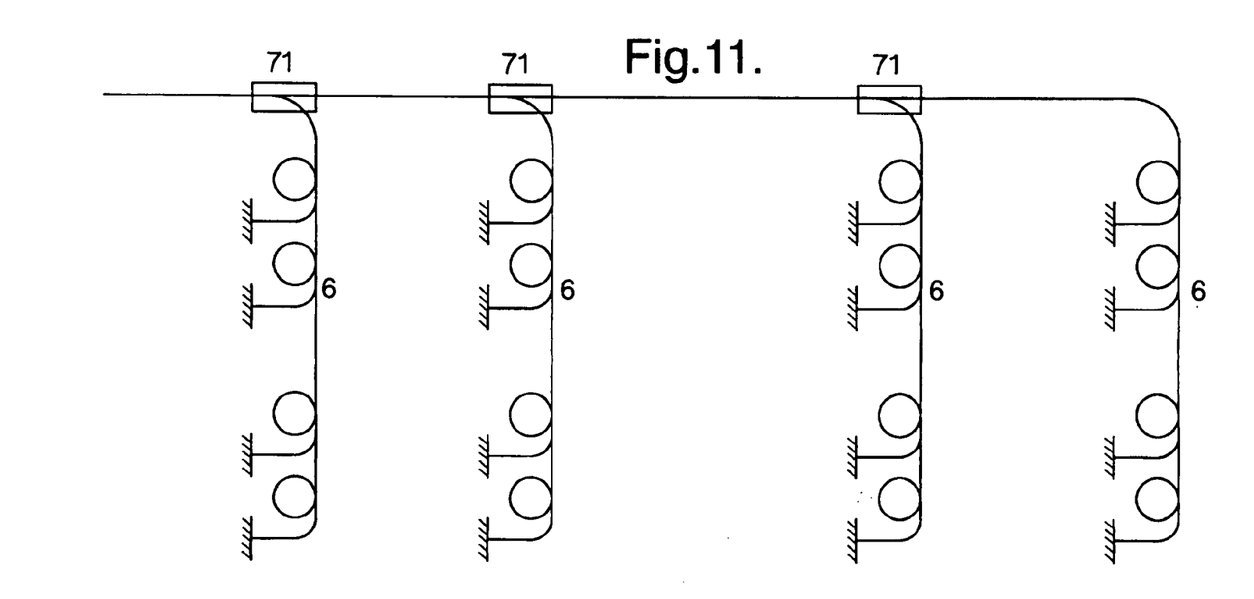
FIG. 11 shows a plurality of optical fibres arranged in parallel and in series.

FIGS. 10 and 11 illustrate possible array architectures. The multiplexing regimes used are Time Division Multiplexing (TDM) in the array of FIG. 10 and both Time Division Multiplexing and Dense Wavelength Division Multiplexing (DWDM) in the architecture of FIG. 11.

FIG. 10 shows the individual seismic sensing device coils (63). The coils (63) are bracketed by couplers (61). Attached to one of the outputs of the coupler (61) is a mirror (62), the other output is connected to a sensing coil (63). These couplers (61) and mirrors (62) are so arranged that there is a reflector before and after each coil so that a pair of light pulses contained within the fibre are reflected from the mirrors (62). The first pulse is split by the first coupler (61) a portion of the pulse is reflected back and the rest is directed into the coil (63), this pulse is then split by the next coupler (61) a portion of the light is then reflected back from the mirror. At the same time the second pulse is being split by the first coupler (61) and one portion of the light is reflected back. The lengths of the fibres and the timing of the pulses are selected such that the second pulse returning from the first mirror and the first pulse returning from the second mirror coincide on the receiver at the same time. Changes in phase between the two signals can be used to detect changes in length and/or refractive index of the coil resulting from strains imposed on the coil.

FIG. 11 shows a plurality of these serially connected strings of vibration sensing devices or seismic sensing devices connected in parallel. The strings of seismic sensing devices are multiplexed and connected in parallel, using DWDM architecture. Items 71 are Multiplex/Demultiplex units these isolate a single frequency from the source and direct it to the relevant Seismic sensing device string and then multiplex the signal back into the signal fibre.

In summary, embodiments of this invention provide a highly sensitive Seismic sensing device which exhibits a low cross-axis sensitivity and can be easily multiplexed using both time division and dense wavelength division multiplexing.

The invention claimed is:

1. A vibration sensing device comprising a flexible disk having a first surface and a second surface, said first and second surfaces lying on either side of a radial plane;
   a mounting means arranged to mount the disk centrally and substantially symmetrically about said radial plane, such that a central portion of said first and said second surfaces of said disk are constrained from moving while the circumferential edge of said disk is free to move;
   a mass located on said disk substantially symmetrically about said radial plane such that the mass contacts only the outer circumferential edge of said disk, and extends toward the radially inner portion of the disk and exerts a force on said disk which is greater towards said circumferential edge of said disk than it is towards said central portion;
   an optical fibre mounted on said first surface of said disk, such that flexion of said disk produces a strain in said optical fibre which imposes a variation in at least one predetermined property of an optical signal transmitted through said optical fibre, said optical fibre being mounted such that at least one end is accessible for optical coupling to an optical device comprising a detector for detecting said changes in said at least one predetermined property of said transmitted optical signal.

2. A vibration sensing device according to claim 1, said vibration sensing device further comprising a counterweight mounted on said second surface of said disk in order to counterbalance said optical fibre.

3. A vibration sensing device according to claim 2, said counterweight comprising a further optical fibre mounted symmetrically about said transverse plane to said optical fibre.

4. A vibration sensing device according to claim 1, said optical fibre being mounted such that both ends of said optical fibre are accessible for optical coupling to further optical devices.

5. A vibration sensing device according to claim 1, wherein said optical fibre is mounted in a spiral on said disk.

6. A vibration sensing device according to claim 1, wherein said first surface of said disk comprises two grooves said two grooves being arranged symmetrically to each other about a first diameter of said disk, each of said two grooves running from a radially inner end to a radially outer end of said disk, a portion of said optical fibre adjacent said at least one accessible end running along at least one of said grooves, said at least one accessible end of said optical fibre being arranged outside of said disk.

7. A vibration sensing device according to claim 6, wherein said outer ends of said grooves lie at a circumferential edge of said disk.

8. A vibration sensing device according to claim 6, wherein said first surface of said disk comprises a further two grooves, said further two grooves being arranged symmetrically about a second diameter of said disk, said second diameter lying at 90° to said first diameter.

9. A vibration sensing device according to claim 6, wherein said second surface of said disk further comprises grooves, said grooves being arranged symmetrically about said radial plane to said grooves on said first surface.

10. A vibration sensing device according to claim 1, wherein said mass is located on said disk close to said circumferential edge of said disk.

11. A vibration sensing device according to claim 1, wherein said mass comprises a pair of annular masses connected together at their outer edges by a cylinder, said cylinder comprising a lip for attachment to said circumferential edge of said disk or said mounting means adjacent to said circumferential edge.

12. A vibration sensing device according to claim 1, said mass comprises a first and a second mass, said first and second mass being mounted symmetrically about said disk to each other.

13. A vibration sensing device according to claim 1 wherein said mass does not extend beyond said circumferential edge of said disk.

14. A vibration sensing device according to claim 12, wherein said mass only contacts said disk at an area adjacent to a circumferential edge of said disk.

15. A vibration sensing device according to claim 12, wherein said mass has an annular shape.

16. A vibration sensing device according to claim 15, wherein said mass has a circumferential lip, said circumferential lip contacting said disk.

17. A vibration sensing device according to claim 15, wherein said mass is mounted to said disk via mass mounting means, said mass mounting means being located at a radially inner portion of said mass and said disk.

18. A vibration sensing device according to claim 12, wherein the first mass has an outer circumferential lip and the second mass has an outer circumferential lip wherein said mounting means pass through holes in said first mass, said disk and said second mass and hold said masses to said disk such that an outer edge of said disk is clamped between said outer circumferential lips of said first and second masses, wherein the mass mounting means do not contact said disk.

19. A vibration sensing device according to claim 1, wherein said optical fibre is mounted towards said circumferential edge of said disk.

20. A vibration sensing device according to claim 1, said vibration sensing device comprising protective sheathing covering said optical fibres.

21. A vibration sensing device according to claim 1, wherein said disk comprises an aluminium disk.

22. A vibration sensing device according to claim 21, wherein said aluminium disk is between 3 mm and 0.5 mm thick, preferably 1 mm thick.

23. A vibration sensing device according to claim 1, said vibration sensing device further comprising a housing, said mounting means mounting said first and said second surfaces of said flexible disk to opposing internal surfaces of said housing.

24. A vibration sensing device according to claim 23, wherein said housing comprises frustoconically shaped end pieces, said disk being mounted to a narrow end piece of said frustoconically shaped end pieces.

25. A vibration sensing device according to claim 24, wherein said mass is shaped such that it fills a substantial portion of the space between said disk and said frustoconically shaped end piece.

26. A vibration sensing device according to claim 1, wherein said at least one predetermined property of said transmitted optical signal comprises the phase of said optical signal.

27. A vibration sensing device according to claim 1, said vibration sensing device comprising an accelerometer.

28. A vibration sensing system, comprising:
a first plurality of vibration sensing devices according to claim 1;
an electromagnetic radiation source and an electromagnetic radiation detector;
said optical fibres of said first plurality of vibration sensing devices being arranged in optical communication with each other and with said electromagnetic radiation source and detector;
said electromagnetic radiation source being operable to transmit an optical signal into said optical fibres of said plurality of vibration sensing devices; and
said electromagnetic radiation detector being arranged to receive electromagnetic radiation output from said plurality of vibration sensing devices and to detect a variation in ax least one predetermined property of said output optical signal.

29. A vibration sensing system according to claim 28, where said first plurality of vibration sensing devices are arranged optically in series.

30. A vibration sensing system according to claim 28, said sensing system further comprising a plurality of partial radiation reflectors, said plurality of partial radiation reflectors being arranged before and after each of said plurality of vibration sensing devices; wherein said electromagnetic radiation source is operable to transmit a plurality of pulses into said first plurality of vibration sensing devices such that a pulse of radiation that is reflected back through one vibration sensing device by a reflector immediately after said vibration sensing device reaches said electromagnetic radiation detector at the same time as, and interacts with, a subsequent pulse reflected by a reflector immediately before said one vibration sensing device; said variations in said at least one predetermined property of said optical signal detected by said electromagnetic radiation detector being variations in phase.

31. A vibration sensing system according to claim 30, further comprising a signal processor including a time division demultiplexer, said signal processor being operable to process signals produced by said electromagnetic detector in response to said variations in phase and to isolate signals from individual vibration sensing devices using said time division demultiplexer.

32. A vibration sensing system according to claim 28, further comprising:
a second plurality of vibration sensing devices comprising
i. a flexible disk having a first surface and a second surface, said first and second surfaces lying on either side of a radial plane;
ii. a mounting means arranged to mount the disk centrally and substantially symmetrically about said radial plane, such that a central portion of said first and said second surfaces of said disk are constrained from moving while the circumferential edge of said disk is free to move;
iii. a mass located on said disk such that it lies substantially symmetrically about said radial plane and exerts a force on said disk which is greater towards said circumferential edge of said disk than it is towards said central portion; and
iv. an optical fibre mounted on said first surface of said disk, such that flexion of said disk produces a strain in said optical fibre which imposes a variation in at least one predetermnined property of an optical signal transmitted through said optical fibre, said optical fibre being mounted such that at least one end is accessible for optical coupling to an optical device comprising a detector for detecting said changes in said at least one predetermined property of said transmitted optical signal wherein said second plurality of vibration sensing devices are arranged optically in series with each other, said second plurality of vibration sensing devices being arranged optically in parallel with said first plurality of vibration sensing devices; and a first and second wavelength multiplex/demultiplex unit operable to isolate a single frequency; wherein said electromagnetic source is operable to produce pulses of radiation at first and second frequencies and said first and second wavelength multiplex/demultiplex units are arranged such that pulses of said first frequency arc transmitted from said source to said first plurality of vibration sensing devices and pulses of said second frequency are transmitted from said source to said second plurality of vibration sensing devices.

33. A vibration sensing system according to claim 32, further comprising at least one further plurality of vibration sensing devices comprising:
   i. a flexible disk having a first surface and a second surface, said first and second surfaces lying on either side of a radial plane;
   ii. a mounting means arranged to mount the disk centrally and substantially symmetrically about said radial plane, such tat a central portion of said first and said second surfaces of said disk are constrained from moving while the circumferential edge of said disk is free to move;
   iii. a mass located on said disk such that it lies substantially symmetrically about said radial plane and exerts a force on said disk which is greater towards said circumferential edge of said disk than it is towards said central portion; and
   iv. an optical fibre mounted on said first surface of said disk, such that flexion of said disk produces a strain in said optical fibre which imposes a variation in at least one predetermined property of an optical signal transmitted through said optical fibre, said optical fibre being mounted such that at least one end is accessible for optical coupling to an optical device comprising a detector for detecting said changes in said at least one predetermined property of said transmitted optical signal; and at least one further wavelength multiplex/demultiplex unit, said at least one further plurality of vibration sensing devices being arranged optically in parallel with said first and said second plurality of vibration sensing devices;

wherein said electromagnetic source is operable to produce pulses of radiation at first, second and at least one further frequency and said at least one further multiplex/demultiplex unit is arranged such that pulses of said at least one further frequency are transmitted from said source to said at least one further plurality of vibration sensing devices.

34. A vibration sensing system according to claim 28, wherein said first plurality of vibration sensing devices are arranged optically in parallel.

* * * * *